Aug. 6, 1968

F. M. MINKS 3,395,685

ELECTRICAL PULSE SOURCE

Filed Feb. 11, 1966

INVENTOR.
FLOYD M. MINKS
BY
Andrus & Starke
Attorneys

Aug. 6, 1968 F. M. MINKS 3,395,685
ELECTRICAL PULSE SOURCE
Filed Feb. 11, 1966 2 Sheets-Sheet 2

INVENTOR
FLOYD M. MINKS
BY
Andrus & Starke
Attorneys

United States Patent Office 3,395,685
Patented Aug. 6, 1968

3,395,685
ELECTRICAL PULSE SOURCE
Floyd M. Minks, Campbellsport, Wis., assignor, by mesne assignments, to Brunswick Corporation, Chicago, Ill., a corporation of Delaware
Filed Feb. 11, 1966, Ser. No. 526,749
28 Claims. (Cl. 123—148)

ABSTRACT OF THE DISCLOSURE

An ignition system includes a capacitor connected to a battery by a condenser and to a distributor by a series connected pulse transformer and silicon controlled rectifier having a gate connected to a trigger capacitor through a transformer. The charging and discharging of the trigger capacitor is controlled by a transistor gated oscillator including an output winding, a collector winding and a base winding. The output winding is connected to fire a gated switch which includes a pair of complementing transistors connected in a regenerative circuit generally in accordance with the equivalent circuit for a silicon controlled rectifier. This switch is connected in parallel with the trigger capacitor and a trigger transformer to periodically discharge the capacitor through the transformer. The trigger capacitor is charged from the battery of the engine through a suitable resistor to establish a charging time constant substantially longer than the period of the oscillator when triggered to oscillate. Its discharge time however through the switch is very rapid. A resistor externally connected between the gate lead and the cathode lead of the switch device effectively controls the holding current of the switch.

The oscillator includes a pair of cores having generally U-shaped portions which are mounted with the ends of the legs in aligned opposed relation. The cores are spaced from each other sufficiently far to permit rotation of the disc therebetween. The oscillator windings are wound one each on the cores and connected in the oscillator circuit. When a slot in the disc is aligned with the cores, magnetic coupling is established between the windings. When the continuous portion of the disc is aligned with the cores, the magnetic coupling between the cores is greatly reduced. Each core is similarly mounted in a conductive member having the lower face coplanar with the end faces of the core legs. The member includes a single slot encompassing the legs and the space between them and thus generally being the same as a slot in the disc.

The collector winding is constructed with a tap to which the base winding is connected to provide a degenerative coupling to positively prevent oscillations except when the coupling is established through the alignment of the nonconductive portion of the vane.

This invention relates to an electrical pulse source and particularly to a pulse source including means to generate pulse signals in accordance with mechanical positioning of a moving element.

Although the present invention in certain aspects may be employed in various pulse circuitry, it is hereinafter described in connection with ignition systems for internal-combustion engines and the like because of its highly satisfactory application therein. With the development of solid state switching devices, various high voltage pulse circuits have been developed for ignition systems and the like. For example, capacitor discharge systems which have been well known for many years have recently been developed more fully employing solid state devices such as silicon controlled rectifiers or other similar switching devices for discharging of the capacitor into the spark plug circuitry. A highly satisfactory capacitor discharge system employing a silicon controlled rectifier is disclosed in applicant's copending application entitled "Triggered Ignition System" which was filed on Oct. 4, 1965 with Ser. No. 492,571 and in which a small commutator is shown connected in the gate circuit of the silicon controlled rectifier to control the firing thereof. This circuit avoids many of the problems associated with breaker point systems which have generally been employed. It does have some disadvantage, however, in connection with the problems associated with commutating devices and the like.

The present invention is particularly directed to a solid state electronic pulse generating source for triggering a solid state switch means forming a part of an ignition system. The novel pulse source includes a gated oscillator operated to establish time spaced pulse trains each of which is a plurality of oscillations. Each pulse train is related to the firing position of the distributor and therefore of the various crank pistons of the cylinder. The output pulse train of the oscillator is fed to a pulse forming circuit having a pulse forming and storage means in combination with a paralleled triggered switch means. The triggered switch is fired to conduct by the initial part of the output pulse train of the oscillator and is specifically selected to revert to the blocking state only at the end of each pulse train. The storage circuit is selected and designed to have a time constant less than the minimum time between pulse trains but substantially greater than each of the individual oscillations within a pulse train. This system has been found to provide a highly reliable single pulse for controlling the firing of the spark plugs in an efficient and reliable manner.

In the preferred construction, the present invention includes a transistor gated oscillator including a transformer having a core, an output winding, a collector winding and a feedback or base winding selectively coupled and decoupled by a moving metal vane such as a rotating disc, having alternate conductive and nonconductive portions. When the conductive portion of the vane is interposed between the magnetic field of the windings, it acts as a short circuited winding and effectively isolates the windings. When the nonconductive portion is aligned with the winding, it permits effective coupling between the two windings to produce oscillations and thus a pulse train output comprising a series of oscillations or signal spikes. The duration of the pulse train is the time interval that the nonconductive portion is aligned with the winding.

The coupling apparatus, in an important aspect of this invention, comprises a pair of cores having generally U-shaped portions with the ends of the legs mounted in aligned opposed relation. The cores are spaced from each other sufficiently far to permit rotation of a disc therebetween. The disc is rotatably mounted adjacent the cores and includes a plurality of radial slots equi-circumferentially spaced about the disc. The oscillator windings are wound one each on the cores and connected in the oscillator circuit. When a slot in the disc is aligned with the cores, magnetic coupling is established between the windings. When the continuous portion of the disc is aligned with the cores, the magnetic coupling between the cores is greatly reduced. Each core is similarly mounted in a conductive member having the lower face coplanar with the end faces of the core legs. The member includes a single slot encompassing the legs and the space between them and thus generally being the same as a slot in the disc. This type of mounting of the core structures substantially decreases the leakage flux paths and provides exceptionally good isolation of the two windings.

In a preferred construction, the collector winding is constructed with a tap to which the base winding is connected to provide a degenerative coupling to positively prevent oscillations except when the coupling is established through the alignment of the nonconductive portion of the vane.

The pulse forming circuit of the present invention in its preferred form includes a pair of complementing transistors connected in a regenerative circuit generally in accordance with the equivalent circuit for a silicon controlled rectifier. This regenerative circuit forms a switch which is connected in parallel with a capacitor and an output load means to provide a discharge circuit for the capacitor. The capacitor is charged from the battery or power circuit of the engine through a suitable resistor or the like to establish a charging time constant substantially longer than the period of the oscillator when triggered to oscillate. Its discharge time however through the switch is very rapid. The advantage of the employment of complementing transistors in the circuit simulating that of a silicon controlled rectifier is that the holding current of the switch device so created can be accurately controlled by controlling the impedance externally connected between the gate lead and the cathode lead of the switch device effectively grounding the input or gate terminal of the switching. In contrast, the holding current of the silicon controlled rectifier is controlled by its internal structure and often varies over a wide range from rectifier to rectifier and further often is unstable with time and temperature. The pulse forming circuit of this invention provides a single effective output pulse for each pulse train of the oscillator. This pulse is used to control firing of the spark plug. Any additional output signals will be insignificant as the storage means can only be slightly charged before the switch is again triggered by the next oscillation in the pulse train.

The drawing furnished herewith illustrates a preferred construction of the present invention clearly disclosing the above advantages and features as well as others which will be clear from the following description and illustration.

Figure 1:
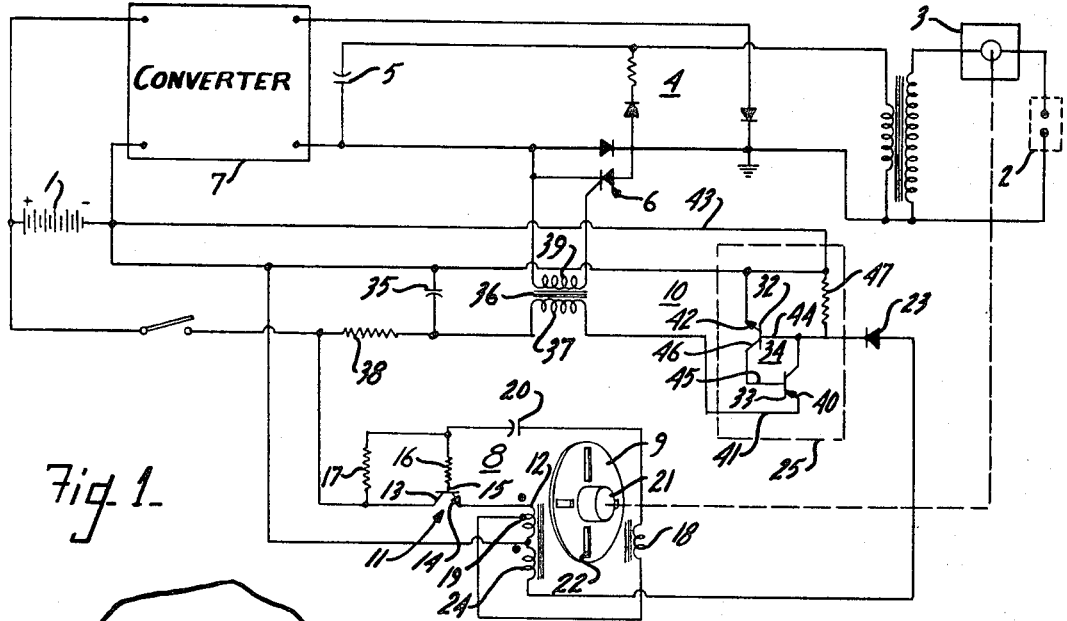
FIG. 1 is a schematic circuit diagram of an internal-combustion engine ignition system incorporating the novel features of the present invention.

Referring to the drawings and particularly to FIG. 1, the illustrated ignition system is connected to a direct current source such as a low voltage battery 1 having a suitable rated output voltage such as 6, 12 or 24 volts all of which are presently employed in automobiles, trucks, outboard motors, or other similar internal-combustion engines. In the illustrated embodiment of the invention, a single spark plug 2 is diagrammatically shown forming a part of a combustion chamber of the prime mover or engine. In multi-cylinder engines, a plurality of spark gaps are normally employed with a distributor 3, shown in block diagram, provided to sequentially distribute power to the several gaps in the proper sequence. The illustrated embodiment of the invention employs a main pulse circuit 4 of the capacitor discharge type which is the subject of the previously referred to copending application of applicant. Generally, the circuit 4 includes capacitor 5 connected in a discharge circuit with a silicon controlled rectifier for periodic transfer of pulse energy to the spark gaps 2. The capacitor 5 is connected to battery 1 through a converter circuit 7 and is rapidly charged to a selected voltage level. The charge is maintained as the silicon controlled rectifier 6 forms an open circuit until such time as it is fired. For the details of this charging circuit and the discharging circuit reference may be made to the above application. No further description thereof is therefore given other than as related to the firing control circuit of the rectifier 6 to clearly set forth and disclose the novel features and advantages of the present invention.

In accordance with the present invention, the silicon controlled rectifier 6 is fired through an improved firing control circuitry including a gated oscillating circuit 8 having a rotating metal vane or disc 9 coupled to the distributor 3 for simultaneous rotation and positioning. The disc 9 is effective to turn the gated oscillating circuit 8 on and off in accordance with the operation of the distributor and therefore provides a position sensing device. The output of the oscillating circuit 8 is interconnected to a pulse source and shaping circuit 10 which forms a particular feature of the present invention and which has its output connected to the gate of the silicon controlled rectifier 6 to control the firing thereof and therefore the transfer of energy from the capacitor 5 to spark plug gap 2.

The gated oscillating circuit 8 includes a transistor 11 shown as an NPN type. The transistor 11 is connected with a tapped winding 12 across the terminals of the battery 1. The transistor 11 includes a collector 13 connected directly to the positive side or line of battery 1 and an emitter 14 connected to the one side of winding 12. The opposite side of the winding 12 is connected to the negative side of the battery 1. The transistor 11 further includes a base 15 connected in series with a base resistor 16 and a bias resistor 17 to the positive terminal of the battery 1 in common with the collector 13. A feedback or oscillating control winding 18 is connected at one end to a tap 19 on the winding 12. A small capacitor 20 interconnects the opposite end of the winding 18 to the junction of the resistors 16 and 17 to provide a feedback signal. Thus, the control winding is positioned in relation to the winding 12 to provide magnetic coupling therebetween whereby when the transistor 11 conducts to provide current flow through the winding 12, a signal is fed back to the base to cause oscillation of the circuit. The series connection of the tapped portion of the winding 12 and the feedback or oscillating control winding 18 provides a degenerative coupling therebetween which prevents oscillations of circuit 8 in the absence of a selected value of coupling between windings 12 and 18.

The slotted control vane member or disc 9 is rotatably mounted on a shaft 21 to rotate between the windings 12 and 18. The disc 9 includes a plurality of circumferentially distributed slots 21 each of which may be related to a given engine cylinder at gap 2. The disc 9 is made of an electrically conductive material such as copper steel or other suitable metal. Steel or the like also provides some magnetic shielding. The slots 21 correspond in number to or a multiple of the engine cylinders thereof and are coupled to be driven in synchronism with the distributor 3.

Each time a slot 22 is aligned with the windings 12 and 18, mutual magnetic coupling is established between the coils and the circuit 8 will oscillate. Conversely, when the continuous solid portion of the disc 9 is interposed between the coils or windings 12 and 18, it functions as a short circuited turn and in essence prevents magnetic coupling between the windings. Consequently, as the disc 9 rotates the oscillator output is a succession of pulse trains each of which consists of a series of signal spikes at the frequency of the oscillator. An output winding 23 is coupled to the main winding 12. The winding 23 is connected in series with a diode 24 to a switch network 25 of circuit 10.

In the present invention, the output signal is fed to the pulse source and forming circuit 10 to provide a single trigger spike or pulse to the silicon controlled rectifier 6 for each pulse train of the oscillating circuit 8.

Figure 2:
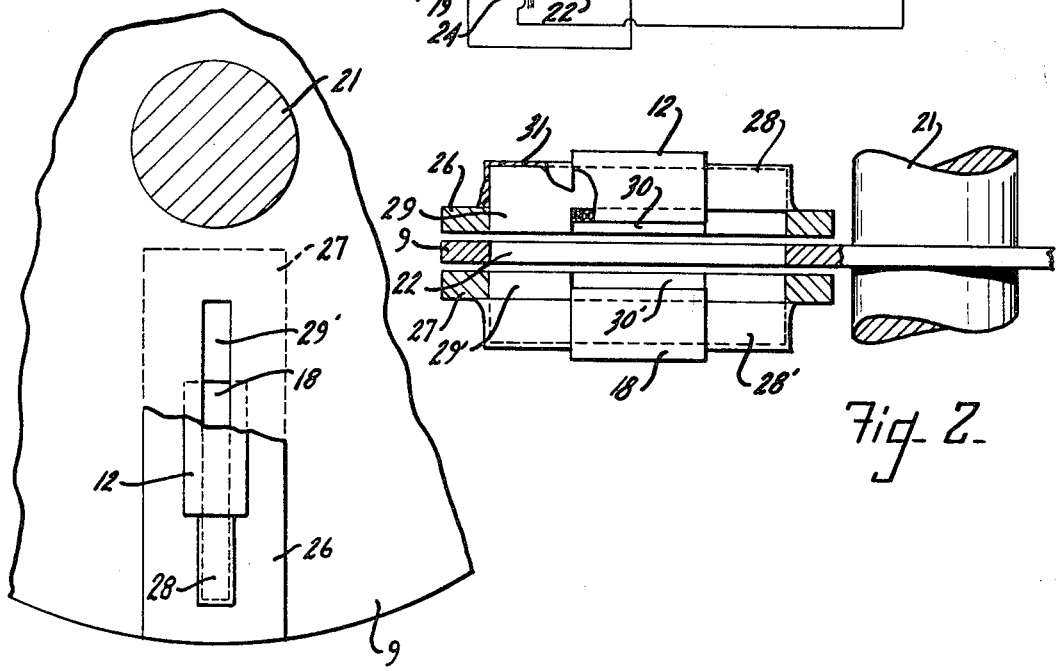
FIG. 2 is a fragmentary side elevational view of a vane controlled winding assembly constructed in accordance with the present invention.
Figure 3:
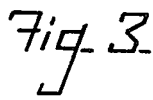
FIG. 3 is a fragmentary top elevational view of FIG. 2.

A highly satisfactory vane and winding construction is shown in FIGS. 2 and 3 wherein similar support plates 26 and 27 are mounted in superposed spaced relation. Windings 12 and 23 are supported on plate 26 in a manner corresponding and similar to the mounting of winding 18 on plate 27. The mounting of windings 12 and 23 to the plate 26 is described in detail and the corresponding mounting of the winding 18 on plate 27 is merely identified in the drawing by corresponding primed numbers.

The support plate 26 is a conducting member formed of a nonmagnetic material. A generally rectangular U-shaped core 28 is provided having the windings 12 and 23 wound on the central portion and having relatively short legs or side arm portions 29. The cross section of arm portions 29 is shown as somewhat greater than that of the central portion to minimize leakage inductance. The core 28 is located on the support plate 26 with the outer ends of the portions 29 located within a slot 30 in the support plate 26 and with the faces of the legs 29 flush with the corresponding face of the plate. The core 28 is secured in position in any suitable manner. In FIG. 2, a suitable adhesive 31, such as an epoxy resin or the like, secures core 28 in place. The slots 22 in the disc 21 are formed to correspond to the slot 30 within which the core 28 is supported. Plates 26 and 27 are mounted in opened relationship with the disc rotatably mounted by shaft 21 immediately adjacent the support plate and with the slotted portion of disc 21 interposed between the support plates 26 and 27 in a parallel plane. As each slot 22 is aligned with the corresponding slot 30 and 30', maximum coupling between the windings or the cores 28 and 28' is provided.

Each time a slot 22 aligns with slots 30 and 30', the windings 12 and 18 are therefore close coupled together to produce oscillations forming a pulse train consisting of a plurality of spikes at the frequency of the oscillator. The spikes within each pulse train slowly increase and decrease in amplitude in accordance with the rate the slot 22 moves into and from alignment with slots 30 and 30'. When the continuous portion of the disc 21 passes between the windings 12 and 18, it acts as a short circuited winding and isolates the windings from each other. During this period, the oscillator 8 is turned off. The small tapped portion of the output winding 12 provides negative feedback of an amplitude greater than the positive turn on signal from the small leakage coupling still existing between windings 12 and 18.

As a result, the oscillator 8 generates a series of oscillating signals separated in time in accordance with the movement of the distributor 3.

The output of the oscillator 8 is fed to the shaping circuit 10 for controlled firing of the silicon controlled rectifier as follows.

Referring particularly to FIG. 1, the network 25 includes a pair of complementary silicon transistors 32 and 33 interconnected with a regenerative feedback loop 34 to form a substantial equivalent of a silicon controlled rectifier. The complementary transistors 32 and 33 form an on-off switching circuit connected in parallel with a trigger capacitor 35 and the primary winding 36 of an output transformer 37. The capacitor 35 is connected in series with a current limiting impedance or resistor 30 to the battery 1. The secondary 39 of output transformer 37 is connected to control firing of the silicon controlled rectifier 6.

Generally, in operation, the battery 1 will charge the capacitor 35. When the switch formed by the complementary transistors 32 and 33 closes, it provides a short time constant discharge circuit for the capacitor 35 which is reflected as a pulse signal to fire the silicon controlled rectifier 6.

More particularly, the transistor 32 is shown as an NPN transistor and the transistor 33 is shown as a PNP transistor. The emitter 40 of the PNP transistor 33 is tied to the positive bus or line 41 and the emitter 42 of the NPN transistor 32 is tied to the negative bus or line 43. The base 44 of transistor 32 is connected to the collector of transistor 33 and constitutes the input gate. The base 45 of the transistor 33 is interconnected to the collector 46 of transistor 32 to form the equivalent transistor circuit of a silicon controlled rectifier. The input gate formed at base 44 is connected to the output diode 23 and thus output winding 24 of the oscillator 8. A resistor 47 interconnects the base 44 directly to the common reference line 43.

Thus, transistors 32 and 33 and resistor 47 form a three terminal network 25 having a gate lead connected to diode 24, anode lead connected to lead 41, and cathode lead connected to lead 43 and forms a silicon controlled rectifier unit. This network operates like a silicon controlled rectifier with one important exception. In a silicon controlled rectifier, the holding current which is the current from anode to cathode just barely sufficient to maintain the controlled rectifier in the on state after firing thereof and in the absence of a gate signal of a silicon controlled rectifier is a parameter that is difficult to control accurately in manufacture, and also changes with other conditions such as temperature. This holding current often cannot be increased appreciably by connecting an external resistor between the gate and cathode because of the relative high resistance between the gate lead and some portions of the rectifier junction to which it is attached of the controlled rectifier. Since this resistance is essentially zero in the configuration shown, the holding current is essentially controlled entirely by resistor 47, and is relatively stable with temperature and the parameters of transistors 32 and 33. The holding current is given approximately by the equation:

$$I_h \text{ amperes} = \frac{.6 \text{ volts}}{R_{47} \text{ ohms}}$$

This equation assumes 0.6 volt which is a typical value for commercially available silicon transistors is required from the base to the emitter of transistor 32 to produce conduction.

Resistor 38 is selected so capacitor 35 is charged essentially to battery voltage between the times the cylinders fire which is related to the time between pulse trains of oscillator 8. The resistor 38 however limits the charging of capacitor to a low value (less than a volt or the like) during the time between spikes with a pulse train.

Resistor 47 is selected so that the steady state current from battery through resistor 38 is below the holding current of network 25.

At maximum engine speed, the time between pulse trains is selected to be approximately the time constant determined by resistor 38 and capacitor 35.

Figure 4:
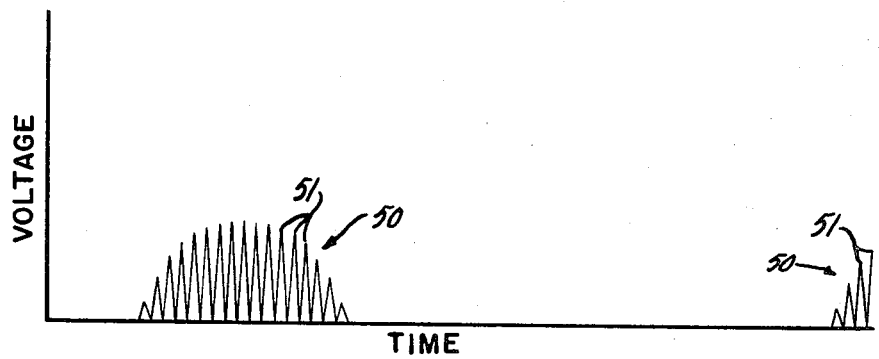
FIGS. 4-6 are diagrammatic illustrations of output voltages of a pulse forming means shown in FIG. 1.
Figure 5:
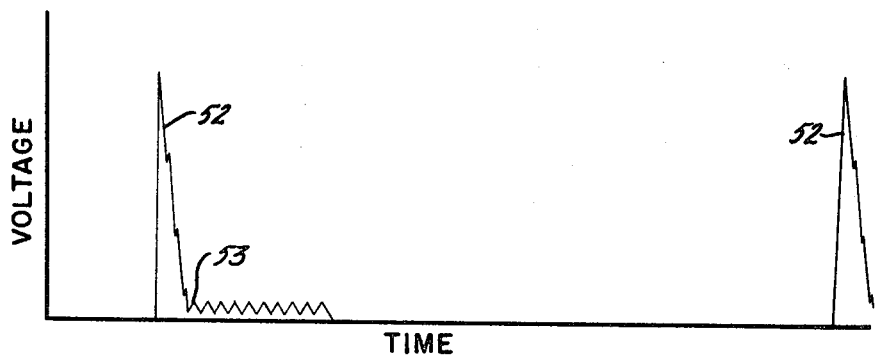
Figure 6:
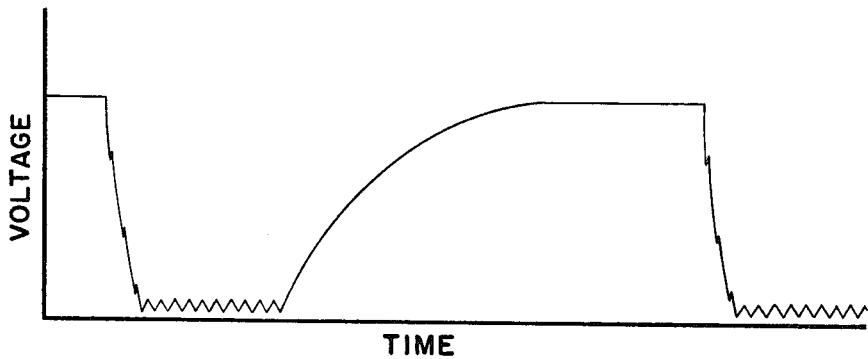

In operation, the first spike of the pulse signal from the oscillator circuit 8 which is of a sufficient magnitude will trigger the complementing transistors 32 and 33 and complete the discharge circuit path across the capacitor 35 and transformer primary 37, providing a very rapid discharge of the capacitor. When the capacitor 35 has discharged, the current of network 25 drops below the holding level and the discharge network opens. The capacitor 35 then begins to slowly charge from battery 1. Before the charge is significant, another spike of the oscillating pulse signal of oscillator 8 may again trigger the transistors 32 and 34 to again conduct. However, the capacitor will carry a very small charge and capacitor 35 generates a pulse of relatively insignificant energy which cannot fire the silicon controlled rectifier. Referring particularly to FIGS. 4-6, the voltage of the oscillator 8, shaping circuit 10 and capacitor 35 is diagrammatically shown. The output of the gated oscillating circuit 8 is a series of pulse trains 50 each of which includes a great number of voltage pulses or spikes 51 which increase and decrease in amplitude as the slot 22 moves into and from alignment with slots 30 and 30'. Until a pulse 51 rises to a triggering level for the network 25, the output of the transformer 36 remains at zero. However, when the first output spike is sufficient to trigger the network, the capacitor 35 rapidly discharges the previously stored energy to provide a very substantial pulse 52 which decays toward zero, as shown in FIG. 5. As it drops below the holding value for the network 25 the circuit resets to an open state and capacitor 35 begins to charge, as shown in FIG. 6. The next spike 51 from the oscillating circuit 8 turns on the network 25 and the capacitor 35 discharges and generates a small amplitude pulse signal 53 as shown in FIG. 5. The network 25 again turns off and the circuit recycles to form a series of small amplitude signals during the presence of a pulse train 50 and of frequency of the oscillator 8, as shown in FIG. 5. However, the total energy in any pulse after the initial pulse is insufficient to cause triggering of the silicon controlled rectifier 6 and consequently the circuit operates as if the small signals were not present.

Between pulse trains 50, network 25 remains open and capacitor 35 charges at the rate determined by the resistance of resistor 38 and the capacitance of capacitor 35, as shown in FIG. 6.

The overall operation of the illustrated embodiment of the invention may thus be briefly described as follows.

The connection of the battery to the ignition power circuit 4 and to the circuit 8 is completed. The battery 1 or other means turns over the engine and simultaneously and in proper timed relation rotates the distributor 3 and the interconnected vane or disc 9. When the solid portions or segments of the disc 9 are interposed between the windings 12 and 18, the oscillator turns off to provide a zero output as diagrammatically shown in FIG. 3. The turnoff is particularly assured as a result of the degenerative coupling between the portion of winding 12 selected at tap 19. Each time a slot 22 is aligned with the slots 30 and 30' in the support plates 26 and 27, the windings 12 and 18 are magnetically coupled to initiate a pulse train 50 shown in FIG. 5. The output signal of the oscillator 8 during the partial and full alignment of the slots is a series of the contiguous spikes of varying amplitude. During the period between the output signal pulses of the oscillator 8 the capacitor 35 is charged to its full value. When the output signal of the oscillator 8 is applied to the gate of the switching network 25 the initial pulse will be insufficient to trigger or turn on the network. However, when the intermediate pulse of an amplitude sufficient to trigger transistor 32 has generated, the network 25 turns on and provides a discharge path across the capacitor 35 in series with the primary 37. The capacitor 35 discharges through the output transformer primary 37 and generates a firing pulse to the rectifier 6.

After the initial discharge of the capacitor 35, the gating base 44 of transistor 32 in network 25 is effectively connected to ground through resistor 47 and the holding current is insufficient to maintain the transistor turned on. Consequently, the switching network 47a reverts to the blocking position. The capacitor 35 then begins to slowly charge. The immediately succeeding pulse or next spike of the pulse train causes discharge of capacitor 35 but the amount of energy for all practical purposes can be completely disregarded.

Each of the output signals of oscillator 8 therefore comprises a band of high frequency pulses or oscillations, only certain of which are sufficient to trigger the switching means. The duration of the train of high frequency pulses or spikes is a function of the width of the apertures. However, as the shaping circuit essentially restricts the effective operation of the output pulse to a single pulse, the construction or the size of the apertures 22 and the alignment of apertures in the plates 26 and 27 and disc 9 is generally not critical to timing accuracy.

The present invention thus provides a means for triggering a main power circuit of a pulse ignition system without the necessity of mechanical contact to moving parts while maintaining highly accurate and reliable discharging of the energy into the spark plugs. The system is designed to permit relatively substantial tolerance in the construction of the several components and the connection of the circuitry and consequently is highly adapted and suitable to mass production. The trigger system has no low speed limitation and a high speed characteristic which can be readily constructed to exceed the capability of all known internal-combustion engines.

Various modes of carrying out the invention are contemplated as being within the scope of the following claims particularly pointing out and distinctly claiming the subject matter which is regarded as the invention.

I claim:

1. An ignition system for an internal-combustion engine having a triggered firing means for connecting a source of energy to the combustion means of the engine, comprising
   a gated oscillator having a magnetic feedback circuit and an output means,
   a cyclically movable control means forming a part of the magnetic feedback circuit to gate the oscillator in a predetermined sequential manner,
   a triggering capacitor connected in a charging circuit and a discharging circuit having load means for connection to said triggered firing means, and
   an electronic switch means connected in the discharging circuit and having an input element connected to said output means of said oscillator whereby said electronic switch means is selectively turned on by said oscillator with said control means in a given position in the feedback circuit.

2. The ignition system of claim 1 wherein the electronic switch means is a pulse responsive switch turned on in response to a selective pulse signal and remains on independently of the pulse signal.

3. The ignition system of claim 1 wherein the electronic switch means is a silicon controlled rectifier unit.

4. The ignition system of claim 1 wherein the electronic switch means comprises
   a pair of complementing transistors each having a base, an emitter and a collector,
   means connecting each base to the collector of the opposite transistor,
   the triggering capacitor being connected in series with the load means and said emitters of said complementing transistors to form the charging circuit,
   the output means of the gated oscillator being connected across the base and emitter of one transistor, and
   a holding current impedance connected between the base and emitter of one transistor to establish a selected holding current.

5. The ignition system of claim 1 wherein the system is a capacitor discharge system having a main capacitor connected in a charging circuit and in a discharging circuit, said discharging circuit including the triggered firing means and a control loop therefor including said triggering capacitor and wherein said electronic switch means is constructed to be regeneratively turned on when its input signal from the gated oscillator reaches a selected amplitude.

6. The ignition system of claim 5 wherein said electronic switch means includes a holding current path and having means establishing a holding current greater than the maximum amplitude of the charging current in the charging circuit of the trigger capacitor.

7. The ignition system of claim 5 wherein a transformer is connected in the discharging circuit of the triggering capacitor and has an output winding connected to the triggered firing means.

8. In an ignition system for an internal-combustion engine, comprising
   a spark voltage generating means connecting an energy source to the combustion means of the engine and having a pulse responsive input means, a control means generating electrical signals in synchronism with the operation of the engine, a pulse forming means independently of the spark voltage generating means and controlled by the electrical signals of the control means to produce an input pulse for the pulse responsive input means, said pulse forming means comprising a charging circuit adapted to be connected to a power source having a selected maximum voltage and including a capacitor connected in series with a current limiting impedance element to establish a maximum amplitude charging current and a discharging circuit including said capacitor in series with an output means and an electronic switch means, said electronic switch means having an input means connected to the control means and constructed to be regeneratively turned on and having means to establish a holding current greater than the maximum amplitude of the charging current.

9. The ignition system of claim 8 wherein said electronic switch means has an input means arranged and constructed to have a sensitivity essentially independent of the voltage to which the capacitor is charged.

10. The ignition system of claim 9 wherein the switch means is a silicon controlled rectifier unit.

11. The ignition system of claim 8 wherein said electronic switch means comprises a pair of complementing transistors connected in regenerative circuit to form a switching network having a gate terminal, said switching network being in series with said capacitor and a means to transfer energy to pulse responsive input means, said gate terminal being connected to the control means.

12. In an ignition system for an internal-combustion engine and the like, a source of energy for firing the engine including an electronic gate controlled switching device for periodic transfer of energy to the combustion means of the engine, said switch device having a gate means for turning said device on, an oscillator circuit including a transistor connected in series with a winding across a pair of incoming power leads adapted to be connected to the electrical power circuit of the engine, said circuit including a feedback winding connected to the transistor to provide regenerative coupling and coupled to a portion of the first named winding for degenerative coupling, said first named winding and said feedback winding being mounted in mutual coupling with an air gap therebetween, output means coupled to the windings to provide an output signal and connected to said gate means to turn on the controlled switching device, a rotating vane of alternate conductive and nonconductive portions in circumferentially spaced array, and means to rotate the vane member in timed relation to the engine to align the nonconductive portions within the air gap to magnetically couple the windings to produce net regenerative feedback and to align the conductive portions within the air gap to magnetically isolate and produce net degenerative feedback from the output to the input of the transistor.

13. The ignition system of claim 12 wherein a connection of said output means to the gate means to turn on the switching device comprises, a trigger pulse circuit including a capacitor and an impedance connected in series across a power source and having a time constant substantially greater than the period of the oscillator, and a pair of complementing transistors connected in a regenerative circuit to form a switching network including a gate terminal, said switching network being connected in series with said capacitor and a means to transfer energy to the input of the gate controlled switching device, said gate terminal being connected to the output of the oscillator circuit to bias the switching network to conduct whereby the pulse spikes of the oscillator fire the switching network to discharge the capacitor to provide a substantial output pulse and all subsequent spikes establish negligible output pulses.

14. The ignition system of claim 1 wherein said gated oscillator includes a member having conductive and nonconductive portions as the movable control member, a pair of magnet cores each having similarly spaced legs with the ends in a common plane, means to mount the cores with the legs in opposed spaced relation defining a pair of air gaps slightly longer than the thickness of the member, and drive means to mount the member within the air gaps and including means for relatively moving the cores and the members to selectively align the conductive portion with the air gaps or the nonconductive portions with the air gaps.

15. The apparatus of claim 14 wherein each core is mounted within an opening in a conducting plate with the surface of the plate that is nearest the vane and the ends of the legs of the core mounted therein in substantially the same plane.

16. The apparatus of claim 14 wherein the vane member is a rotatable member having the nonconductive portions completely surrounded by a conductive portion.

17. The apparatus of claim 14 wherein the rotatable member is a disc having the nonconductive portions circumferentially spaced about the center of the disc and each being on a radius of the disc.

18. A pulse forming circuit, a gated oscillator having means to turn the oscillator on and off to produce a pulse train including a series of time spaced pulses each of which comprises a series of signal spikes, a pulse circuit including a capacitor in series with an impedance and an energy source and having a time constant substantially greater than the period of said signal spikes but short enough to allow for substantially charging the capacitor in the period between pulses of said train, and an electronic switch means connected to deliver energy from the capacitor to a load and having an input gate connected to the oscillator, said switch means firing in response to a selected amplitude of signal from the gated oscillator and thereafter remaining on independently of said signal to discharge said capacitor.

19. In the pulse forming circuit of claim 18 wherein said electronic switch includes, a pair of complementing transistors connected in a regenerative circuit to form a switching network including a gate terminal, said switching network being connected in series with said capacitor and a means to transfer energy to a load, said gate terminal being connected to the output of the oscillator circuit to bias the switching network to conduct whereby the pulse spikes of the oscillator fire the switching network to discharge the capacitor to provide a substantial output pulse and all subsequent spikes establish negligible output pulses.

20. A pulse forming circuit adapted to be energized from a direct current source comprising, a capacitor, a resistor connected in series with the capacitor for connection to the source, a discharge circuit including said capacitor in series with a load means and a switch means, said switch means includes a pair of complementing transistors each having a base, an emitter and a collector, means connecting each base to the collector of the opposite transistor, the triggering capacitor being connected to the emitters, and a holding current impedance connected between the base and emitter of one transistor to establish a selected holding current.

21. Apparatus for coupling and decoupling a pair of windings, comprising
a member having conductive and nonconductive portions,
a pair of magnet cores each having similarly spaced legs,
means to mount the cores with the legs in opposed spaced relation and defining a pair of air gaps slightly longer than the thickness of the member, and
drive means to mount the member within the air gaps and including means for relatively moving the cores and the members to selectively align the conductive and the nonconductive portions with the air gaps.

22. The apparatus of claim 21 wherein said cores are generally U-shaped and the windings are wound on the base portion between the legs.

23. Apparatus of claim 21 wherein the member is a disc having an axis of rotation and having a radius greater than the lateral spacing of the legs and the disc is rotatably mounted to continuously pass through the air gap, the conductive and nonconductive portions being circumferentially spaced about the axis of the disc.

24. The apparatus of claim 21 wherein each core is mounted within an opening in a conductive plate with the surface of the plate adjacent the member and the ends of the legs of the core being in substantially the same plane.

25. The apparatus of claim 24 wherein each nonconductive portion is completely surrounded by a conductive portion.

26. The apparatus of claim 24 wherein the member is a disc member having the nonconductive portions circumferentially spaced about a center of rotation and each being on a radius of the disc member, said disc member being rotatably mounted to one side of the cores to rotate within the gaps between the plates.

27. The apparatus of claim 21 wherein each nonconductive portion is completley surrounded by a conductive portion.

28. The apparatus of claim 21 having the magnetic cores similar U-shaped cores having legs with planar ends located in a common plane,
a pair of conductive plates each having an internal slot of a length corresponding to the outer length defined by the legs of a core and a width corresponding to the width of the legs,
means to mount each core with one plate with the legs within the slot and with the lower surface of the plate in the common plane, and
a rotatably mounted disc mounted on an axis to one side of the cores and projecting through the gap defined by the ends of the core legs and the plates, said disc having a plurality of circumferentially spaced and radially extended slots each of which is at least as wide as the slot and lies wholly within the disc.

References Cited

UNITED STATES PATENTS

| | | | |
|---|---|---|---|
| 3,131,327 | 4/1964 | Quinn | 123—148 |
| 3,240,198 | 3/1966 | Loudon et al. | 123—148 |
| 3,277,340 | 10/1966 | Jukes et al. | 123—148 |

OTHER REFERENCES

Solid State Products Inc., Bulletin D420-02-12-59, December 1959 (pp. 5 and 6).

LAURENCE M. GOODRIDGE, *Primary Examiner.*